United States Patent [19]

Behringer

[11] Patent Number: 5,467,959
[45] Date of Patent: Nov. 21, 1995

[54] CHRISTMAN TREE CLAMPING STAND

[76] Inventor: Mark R. Behringer, 66 Hancock St., Reading, Mass. 01867

[21] Appl. No.: 380,730

[22] Filed: Jan. 30, 1995

[51] Int. Cl.⁶ ................................................. F16M 13/00
[52] U.S. Cl. ................................................ 248/523; 47/40.5
[58] Field of Search ............................... 248/523, 511, 248/519, 514, 515, 516, 527, 346; 47/40.5

[56] References Cited

U.S. PATENT DOCUMENTS

| | | | |
|---|---|---|---|
| 1,568,758 | 1/1926 | Malcolm | 248/523 |
| 4,436,272 | 3/1984 | Lile et al. | 248/527 |
| 4,712,328 | 12/1987 | Gles | 47/40.5 |
| 5,114,113 | 5/1992 | Krinner | 248/525 |
| 5,137,246 | 8/1992 | Idso | 248/523 |
| 5,160,110 | 11/1992 | Praegitzer | 248/523 |

*Primary Examiner*—Ramon O. Ramirez
*Attorney, Agent, or Firm*—Norman B. Rainer

[57] ABSTRACT

A device for securing a tree in an upright disposition includes a base having a platform which pivotably secures four arms having gripping teeth and capable of moving toward a centered aperture intended to receive a trunk of a tree. The arms are interactive with a cable disposed in a circuitous loop. A turning mechanism winds the cable upon a spool, causing the diameter of the loop to diminish, and thereby urging the arms into gripping engagement with the tree trunk. A locking feature associated with the spool retains the arms in gripping position.

7 Claims, 2 Drawing Sheets

CHRISTMAN TREE CLAMPING STAND

BACKGROUND OF THE INVENTION

1. Field of the Invention

This invention relates to an adjustable holder, and more particularly concerns a device for securing a Christmas tree in a vertical disposition.

2. Description of the Prior Art

Many forms of stands have earlier been disclosed for supporting Christmas trees that have been cleanly cut at the base of the trunk, forming a flat stump surface. In general, such stands utilize one or more inwardly projecting threaded members which are caused to tightly abut the trunk of the tree. Such devices are often inadequate because limited force can be applied to the threaded members, and irregularities in the trunk contour lead to insecure gripping action.

U.S. Pat. No. 5,114,113 to Krinner discloses a Christmas tree stand wherein four arms, pivotably movable in vertical planes, are caused to converge upon the tree trunk by means of a cable that interacts with the arms. However, the tortuous path taken by Krinner cable, and the unsupported character of the individual arms predispose the device to difficult operation. Also, because the arms of the Krinner device are downwardly directed, trunks of small diameter are not gripped as well as large-diameter trunks.

It is accordingly an object of the present invention to provide a Christmas tree stand capable of imparting sufficient gripping force upon the trunk of a cut tree to maintain the tree in vertical disposition.

It is a further object of this invention to provide a Christmas tree stand of the aforesaid nature capable of gripping trunks of various diameters and irregular configuration without the need to precisely center the trunk within the stand.

It is yet another object of the present invention to provide a Christmas tree stand of the aforesaid nature which may be easily operated by a single individual nature which may be easily operated by a single individual without the use of tools.

It is still another object of this invention to provide a Christmas tree stand of the aforesaid nature which is durable, aesthetically pleasing, and amenable to low cost manufacture.

These and other beneficial objects and advantages will be apparent from the following description.

SUMMARY OF THE INVENTION

The above and other beneficial objects and advantages are accomplished in accordance with the present invention by a stand device for use with a cut Christmas tree having a substantially flat stump surface, said stand comprising:

1) a base adapted to rest securely upon a fiat floor,
2) horizontally disposed platform means disposed atop said base and having a central aperture,
3) four gripping arms, each arm having a proximal extremity pivotably attached to said platform means, and a distal extremity provided with a rounded bearing surface, the sites of said pivotal attachment defining a substantially square locus symmetrically disposed about said aperture, said arms being substantially flat and bounded by an outer edge and opposed inner edge provided with a series of teeth, two of said arms, constituting a first pair, and whose proximal extremities are attached to said platform means diametrically opposed sites, are caused to slidably interact with the remaining two arms which constitute a second pair, the manner of such interaction being such as to constrain all arms to movement upon a plane parallel to said platform means while causing all said inner edges to be directed toward the center of said aperture,
4) a tightening cable deployed in a circuitous path. substantially parallel to said platform means in contact with said bearing surfaces, whereby, as the length of said path is shortened, said arms are moved with uniform force toward said aperture, said movement, representing a closing action of the arms.
5) turning means for shortening said circuitous path while applying tensile force to said cable, including means for storage of a portion of said cable in a helically wound state,
6) releasible pawl means for enabling said turning means to be secured at any rotative position while maintaining said tensile Force,
7) spring means interactive between the proximal extremity of each arm and said platform means to provide a force resistive of the closing action of the stuns, and
8) stationary securing means associated with said base for engaging said flat stump surface.

In a preferred embodiment, the base includes a housing capable of holding water for the dual purpose of providing stabilizing weight to resist toppling of the tree, and to maintain the tree in a hydrated state.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
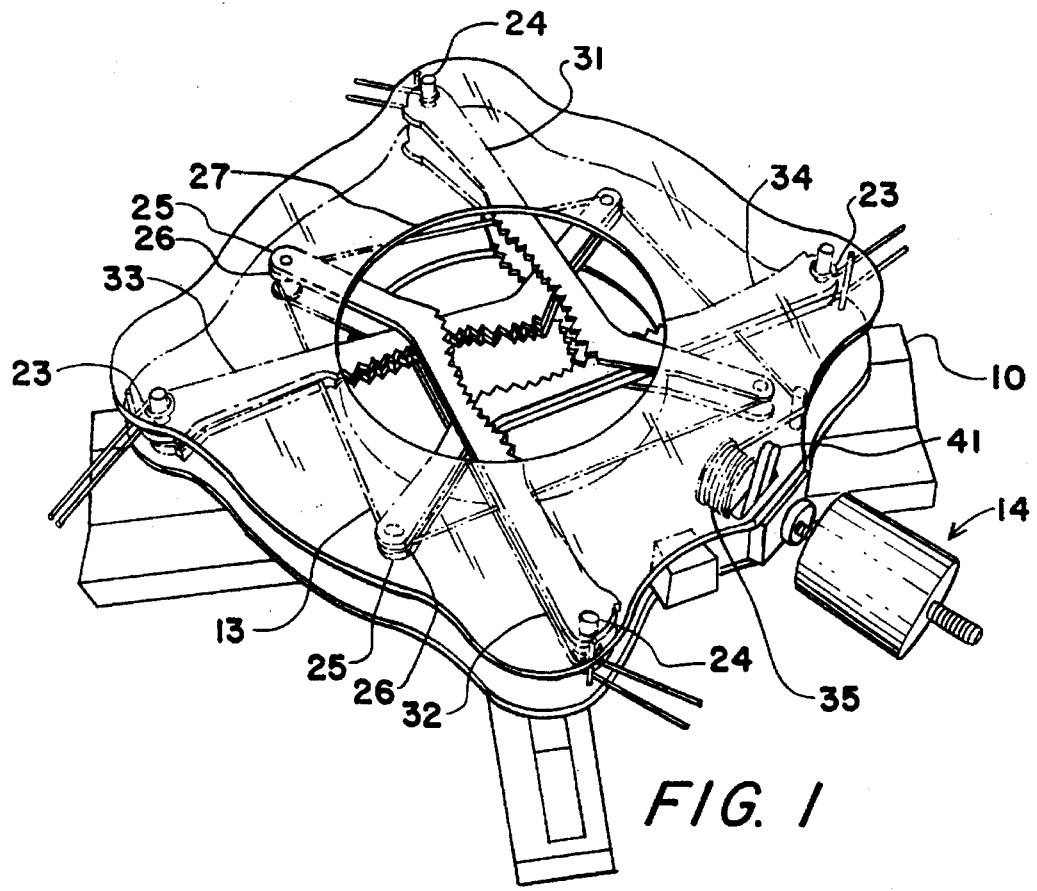
FIG. 1 is a perspective top view of an embodiment of the stand device of this invention.
Figure 2:
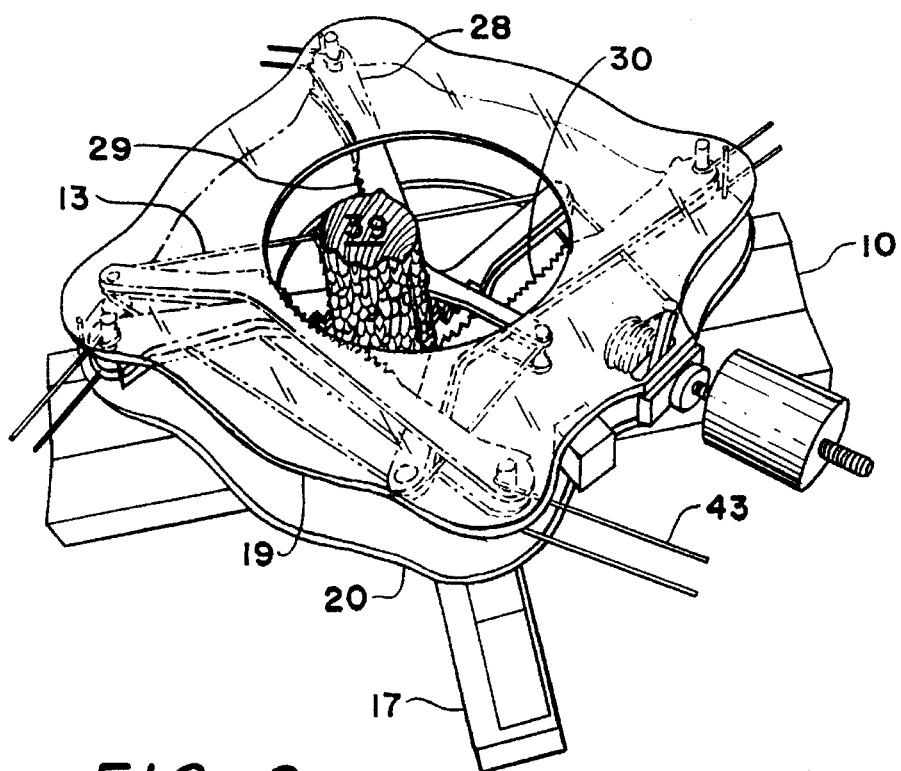
FIG. 2 is a view similar to FIG. 1 but showing the device in functional engagement with a small diameter tree trunk.
Figure 3:
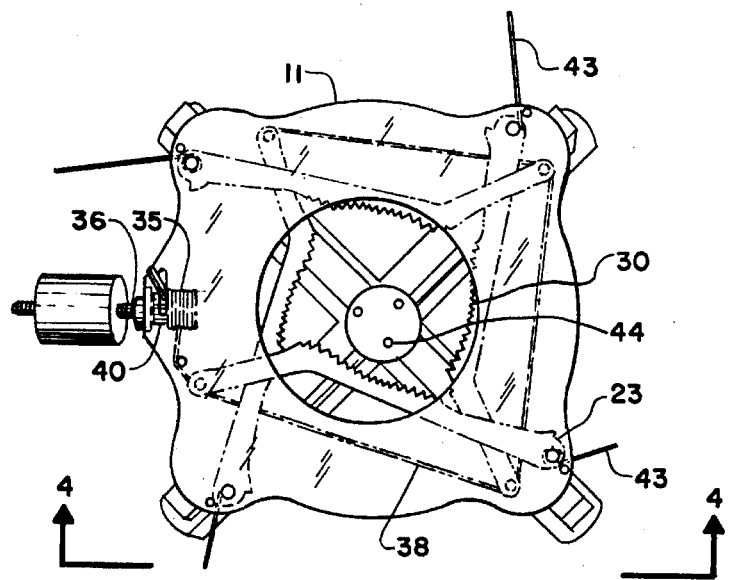
FIG. 3 is a top plan view of the embodiment of FIG. 1.

Referring to FIGS. 1–5, an embodiment of the stand device of this invention is shown comprised of base 10, platform means 11, gripping arms 31, 32, 33 and 34 attached to said platform means, tightening cable 13 interactive with said ,gripping arms, and turning means 14 for acting upon cable 13.

Figure 4:
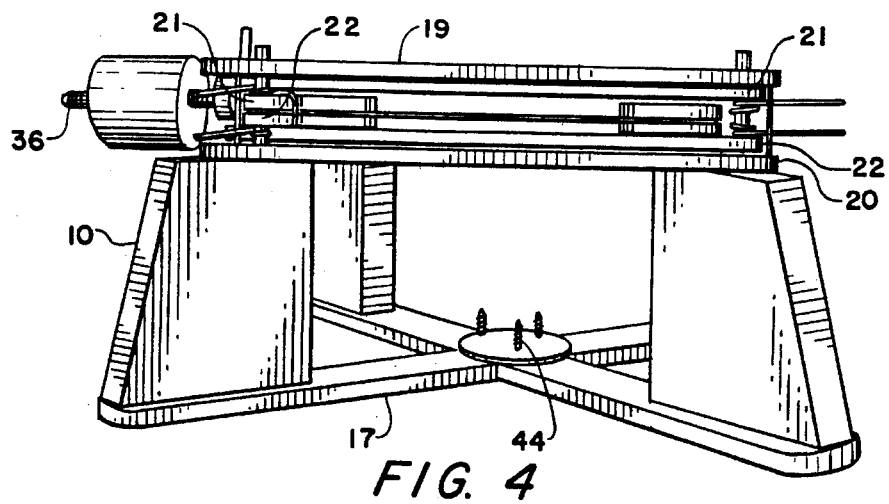
FIG. 4 is a side view taken in the direction of the arrows upon the line 4—4 of FIG. 3.
Figure 5:
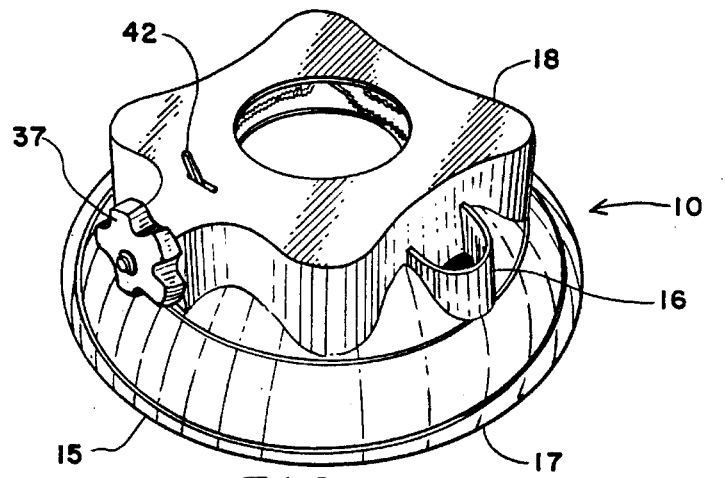
FIG. 5 is a perspective view of an alternative embodiment of the device of this invention.

Base 10 may be of wood or metal construction, as shown in FIG. 4, or may be of plastic construction, as shown in FIG. 5 wherein the lower portion of the base is a water-confining plastic housing 15 having closure-equipped filling port 16. The lowermost extremity 17 of the base is adapted to provide a secure footing upon a flat floor surface. At its uppermost extremity, said base may have a cover plate 18 which enhances the appearance of the device while providing easy access to internal components.

Platform means 11, as exemplified in the embodiment of FIGS. 1–4, is comprised of paired flat upper and lower plates 19 and 20, respectively, of essentially identical construction. The plates are attached to base 10 adjacent the uppermost extremity thereof, and parallel to the lowermost extremity thereof. Although exemplified in the drawings as being fabricated of transparent plastic such as acrylic sheet material, the plates can be fabricated of other rigid durable materials such as wood, metal and composite materials and may be molded structures incorporating other components of the stand device. In other embodiments, the platform means may be comprised of a single plate. Platform means 11 has a central aperture 27 of preferably circular contour.

Each gripping arm is comprised of identical upper and lower flat arm members 21 and 22, respectively, a proximal extremity 23 attached by pivot pin 24 to platform means 11, and a distal extremity 25 having a rounded bearing surface 26 interposed between said upper and lower arm members. The sites at which pivot pins 24 are attached to platform means 11 define a substantially square locus which is symmetrically disposed about aperture 27.

Each arm member is bounded by an outer edge 28 and opposed inner edge 29 provided with a series of teeth 30. Two of said gripping arms whose proximal extremities are attached to said platform at diametrically opposed sites, for example gripping arms 31 and 32, constitute a first pair of gripping arms. The remaining gripping arms 33 and 34 constitute a second pair of arms. In the exemplified embodiment, the gripping arms of said second pair are positioned so as to slide between the upper and lower arm members of said first pair of gripping arms. The manner of such interaction is to constrain all arms to movement in planes between and parallel to plates 19 and 20. The toothed inner edges of all arm members are directed toward the center of aperture 27.

Tightening cable 13 is deployed in a circuitous path 38 substantially parallel to said platform means, and in contact with bearing surfaces 28. One extremity of cable 13 is anchored to one arm, adjacent the distal extremity thereof. The opposite, free extremity of said cable is attached to spool component 35 of turning means 14 mounted upon shaft 36 rotatively held by said platform means. In a preferred embodiment, means are provided to cause axial reciprocal movement of spool 35, thereby preventing the cable from winding uncontrollably upon itself. A turning knob 37 is attached to the unsupported extremity of shaft 36 to enable said cable 13 to be helically wound upon spool 35 while also applying tensile force to the cable. The winding movement of spool 35 causes the length of circuitous path 38 to diminish. Such action causes the gripping arms to move with substantially uniform force toward said aperture. This represents a closing action which causes said toothed portions of said gripping arms to abut against trunk 39 placed upright within said aperture. Because the aforesaid components and their interaction permit independent movement of each gripping arm, trunks of various diameters and shapes can be engaged at any site within aperture 27. A clutch mechanism may be associated with shaft 36.

A toothed ratchet wheel 40 is orthogonally affixed to shaft 36. A pawl 41 pivotably secured to said platform means interacts with wheel 40 in a manner to prevent any undesired reversal in turning direction of spool 35. An upwardly directed lever 42 permits the pawl to be manually released to permit unwinding of cable from spool 35.

Spring means in the form of a spring wire 43 looped around each pivot pin 24 engages each gripping arm and an opposing stationary surface in a manner to resist the closing force applied by the cable. By virtue of the action of said springs, the gripping arms automatically move away from the secured trunk when the tension on the cable is diminished, as by turning the spool in the opposite direction.

Stationary securing means in the form of pointed spikes or screws 44 are upwardly directed from base 10 at a location below the center of aperture 27. Said securing means engages the flat stump surface of trunk 39 to prevent lateral movement of the trunk within base 10.

Knob 37 may be easily removable from shaft 36 to deactivate the clamping mechanism for safety purposes. In a further embodiment, the turning mechanism may be provided with a torque-limiting feature to prevent over-stressing of the clamping components.

By virtue of the aforesaid manner of construction, the cable travels a simple path and is easily manipulated. The cable is not required to take numerous angled turns, as in the aforesaid Krinner reference, where each turn imparts significant frictional resistance and wear. Also, because the gripping arms are disposed in a low horizontal plane, the base can accommodate a large volume of water and can easily receive a decorative cover plate 18, as shown in FIG. 5. The absence of upwardly protruding members facilitates packaging for commercial distribution.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A stand device for use with a cut Christmas tree having a substantially flat stump surface, said stand comprising:

a) a base adapted to rest securely upon a flat floor, b) horizontally disposed platform means disposed atop said base and having a central aperture, c) four gripping arms, each arm having a proximal extremity pivotably attached to said platform means, and a distal extremity provided with a rounded bearing surface, the sites of said pivotal attachment defining a substantially square locus symmetrically disposed about said aperture, said arms being substantially flat and bounded by an outer edge and opposed inner edge provided with a series of teeth, two of said arms, constituting a first pair, and whose proximal extremities are attached to said platform means in diametrically opposed sites, being slidably interactive with the remaining two arms which constitute a second pair, the manner of such interaction being such as to constrain all arms to movement upon a plane parallel to said platform means while causing all said inner edges to be directed toward the center of said aperture, d) a tightening cable deployed in a circuitous path substantially parallel to said platform means in contact with said bearing surfaces, whereby, as the length of said path is shortened, said arms are moved with uniform force toward said aperture, said movement representing a closing action of the arms e) turning means for shortening said circuitous path while applying tensile force to said cable, including means for storage of a portion of said cable in a helically wound state, f) releasable pawl means for enabling said turning means to be secured at any rotative position while maintaining said tensile force, g) spring means interactive between the proximal extremity of each arm and said platform means to provide a force resistive of the closing action of the arms, and h) stationary securing means associated with said base for engaging said flat stump surface.

2. The stand device of claim 1 wherein said base includes a housing adapted to hold a supply of water for providing stabilizing weight to resist toppling of the tree, and for maintaining the tree in a hydrated state.

3. The stand device of claim 2 wherein said housing has a closure-equipped filling port.

4. The device of claim 1 wherein said base has at its uppermost extremity a cover plate which enhances the appearance of the device.

5. The device of claim 1 wherein said platform means is comprised of paired substantially flat upper and lower plates disposed in parallel relationship to said base.

6. The device of claim 1 wherein the two arms of said first pair are each comprised of upper and lower flat arm members.

7. The device of claim 1 wherein one extremity of said cable is anchored to one arm adjacent the distal extremity thereof, and the opposite extremity of said cable is attached to said turning means.

* * * * *